United States Patent
Tebeka

(10) Patent No.: US 6,184,998 B1
(45) Date of Patent: *Feb. 6, 2001

(54) ADDING PRINTING TO THE WINDOWS REGISTRY

(75) Inventor: Haim M. Tebeka, Palo Alto, CA (US)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/929,776

(22) Filed: Sep. 15, 1997

(51) Int. Cl.⁷ .................................................. G06F 15/00
(52) U.S. Cl. .......................................... 358/1.15; 358/1.13
(58) Field of Search ..................................... 395/114, 712, 395/651, 500.44–500.49, 527; 707/203; 358/1.15, 1.13, 1.14, 1.16, 1.17, 1.18, 1.9, 1.6, 1.1, 407, 434, 435, 436, 437, 438, 439, 468; 710/8, 14–19, 62, 64, 72; 345/326

(56) References Cited

U.S. PATENT DOCUMENTS

| | | | |
|---|---|---|---|
| 4,979,107 | * 12/1990 | Advani et al. ....................... | 395/280 |
| 5,047,957 | 9/1991 | Ikenoue ................................. | 364/519 |
| 5,371,837 | 12/1994 | Kimber et al. ....................... | 395/114 |
| 5,450,571 | 9/1995 | Rosekrans et al. .................. | 395/500 |
| 5,467,434 | 11/1995 | Hower, Jr. et al. .................. | 395/114 |
| 5,550,957 | 8/1996 | Davidson, Jr. et al. ............. | 395/114 |
| 5,692,111 | * 11/1997 | Marbry et al. ....................... | 395/114 |
| 5,832,191 | * 11/1998 | Thorne ................................. | 395/114 |
| 5,848,231 | * 12/1998 | Teitelbaum et al. ................. | 395/186 |
| 5,867,633 | * 2/1999 | Taylor, III et al. .................. | 358/1.9 |

OTHER PUBLICATIONS

"Read Me First", Lexis·Nexis, No. P2219–1.

* cited by examiner

Primary Examiner—Dov Popovici
(74) Attorney, Agent, or Firm—Fitzpatrick, Cella, Harper & Scinto

(57) ABSTRACT

A new printer for use in a Windows operating system is created by obtaining a new printer name, copying data corresponding to an existing printer, so as to obtained copied data, and substituting data corresponding to the new printer name into the copied data. Also provided is a printer driver for a Windows operating system which includes a number of user-selectable configuration settings and a user-selectable interface for instructing creation of a new printer. In response to actuation of the user-selectable interface, code within the printer driver creates the new printer and accesses an API of the Windows operating system so as to add an entry for the new printer to a printers branch of a registry in the Windows operating system. The new printer stores user-selected configuration settings together with a name of the new printer, and a value that points to a printer driver already installed in a drivers branch of the registry.

81 Claims, 14 Drawing Sheets

[HKEY_LOCAL_MACHINE\System\CurrentControlSet\control\Print\Printers\Canon BJC-4200]
Status=00,00,00,00
Attributes=50,08,00,00
76 Name=Canon BJC-4200
Default DevMode=
Share Name=
Port=LPT1:
Print Processor=Canon FastPrint Print Processor
Printer Driver=Canon BJC-4200
Location=
Description=
Parameters=
Separator File=
Priority=01,00,00,00
UntilTime=00,00,00,00
StartTime=00,00,00,00
Datatype=CSF

[HKEY_LOCAL_MACHINE\System\CurrentControlSet\control\Print\Printers\Canon BJC-4200\PrinterDriverData]
PrinterID=13,23,5e,27

FIG. 3D

[HKEY_LOCAL_MACHINE\System\CurrentControlSet\control\Print\Printers\Suzy's]
Status=00,00,00,00
Attributes=50,00,00,00      81
80 Name=Suzy's
Default DevMode=53,75,7a,79,27,73,00,00,00,00,00,00,00,00,00,00,
00,00,00,00,00,00,00,00,00,00,00,00,00,00,00,00,00,04,01,04,
94,00,a2,00,03,67,00,04,01,00,01,00,00,00,00,00,00,00,01,00,
01,00,2c,01,01,00,01,00,2c,01,02,00,00,00,00,00,00,00,00,00,
00,00,00,00,00,00,00,00,00,00,00,00,00,00,00,00,00,00,00,00,
00,00,00,00,00,00,00,00,00,00,00,00,00,00,00,00,00,00,00,00,
00,00,00,00,00,00,00,00,00,00,00,00,00,00,00,00,00,00,00,00,
02,00,00,00,00,00,00,00,00,00,00,00,01,00,40,00,4d,53,55,44,
4e,03,48,50,20,4c,61,73,65,72,4a,65,74,20,49,49,49,00,00,00,
00,00,00,00,00,00,00,00,00,00,00,00,00,00,a0,01,00,00,00,00,
00,00,00,00,00,00,00,00,00,00,64,00,0a,00,00,00,01,00,62,00,
03,00,00,00,bc,02,00,00,00,00,00,00,02,00,fa,00,b4,00,fa,00,
fa,00,00,00,00,00,00,00,00,00,00,00,00,00,00,00,00,00,00,00,
ff,ff,03,00,ff,ff,ff,ff,ff,ff,00,00,00,00,00,00,00,00,ff,ff,
00,00,00,00,ff,ff,ff,ff,ff,ff,ff,ff,ff,ff,ff,ff,ff,ff,ff,ff,
ff,ff,ff,ff,ff,ff,ff,ff,ff,ff,ff,ff,ff,ff
Share Name=
Port=\\CA_OFFICE\SUZY_Q
Print Processor=WinPrint
Printer Driver=HP LaserJet III
Location=CA_OFFICE
Description=CA_OFFICE/SUZY_Q
Parameters=
Separator File=
Priority=01,00,00,00
UntilTime=00,00,00,00
StartTime=00,00,00,00
Datatype=SMF

[HKEY_LOCAL_MACHINE\System\CurrentControlSet\control\Print\Printers\Suzy's\PrinterDriverData]

FIG. 3E

ADDING PRINTING TO THE WINDOWS REGISTRY

BACKGROUND OF THE INVENTION

1. Field of the Invention

The present invention concerns adding new printers to the "Printers" folder in a Windows-based operating system. In particular, the invention facilitates adding one or more new printers to the folder, each utilizing the same printer driver but having different configurations set for the printer driver.

2. Description of the Related Art

Windows-based operating systems, such as Windows 95™, allow a user to select which printer to print to from among multiple printers that are usually displayed in a "Printers" folder. Ordinarily, each of the printers displayed in the Printers folder corresponds to a physical printer, i.e., a printer either connected directly to the computer or one that is accessible to the computer over a network.

Windows 95™ allows a user to add printers into the Printers folder by double clicking on the "Add Printer" icon, which is provided by Windows 95™ in the Printers folder. Thus, Windows 95™'s "Add Printer" feature is commonly used when a new physical printer is connected (either directly or via a network) to the computer. The new printer has properties associated therewith, including a particular Windows printer driver as well as printer configuration settings such as paper mode and spooling mode. Windows stores at least some of the printer properties in the Windows registry.

In addition, a user can use the Windows 95™ "Add Printers" feature to add a printer that in actuality corresponds to the same physical printer as an existing printer in the Printers folder. In this case, the user would click on the "Add Printer" icon, and provide the information requested by a series of Windows-provided dialog boxes, specifying the same printer driver as that of the existing printer. Once created, the user could then change the configuration settings of the new printer using the new printer's "Properties" sheet. The end result would therefore be a new printer which specifies the same physical printer and the same printer driver as an existing printer, but which has different configuration settings.

Thus, for example, if a particular physical printer has duplex print capabilities, a user might define two printers: one in which configuration settings for the printer driver set the printer into one-sided mode, and another in which the configuration settings set the printer into duplex printing mode. Then, merely by selecting which printer to use, a user can obtain one-sided or duplex printing without the need to switch configuration settings before printout.

Since the switching of configuration settings is often a time-consuming and cumbersome procedure, using multiple printers for the same physical printer is often useful and desirable. In particular, it is often desirable to use different configuration settings for different application programs. In this case, a different printer with appropriate configuration settings can be added for each such application program, thereby largely obviating the need to change settings each time a user wants to print from a different application program.

However, addition of printers according to the foregoing method is not straightforward, particularly for a user not technically familiar with the Windows 95™ operating system. Specifically, to add a new printer in Windows 95™, a user must double click on the "Add Printer" icon, which is counter-intuitive to most users, particularly when a printer already exists in the Printers folder for a particular physical printer. Then, the user must follow a series of installation instructions, and must ignore a series of warning messages that caution against creation of a printer using a printer driver identical to one already in use. Furthermore, a user will often desire to add a new printer which differs with respect to only one or two configuration settings from those of an existing printer. However, since the Windows 95™'s "Add Printer" feature generally creates a new printer with a predetermined default configuration, a user often will be required to make extensive changes to the default configuration in order to obtain the desired settings, rather than simply changing the one or two settings that are different from the existing printer.

Thus, a need exists for the ability to add new printers more easily.

SUMMARY OF THE INVENTION

This need is addressed in the present invention, in which a new printer is automatically created and added to the Windows registry based on the configuration settings of a selected existing printer or based on user-selected configuration settings.

Thus, in one aspect the invention creates a new printer for use in a Windows operating system by obtaining a new printer name, copying data corresponding to an existing printer, so as to obtain copied data, and substituting data corresponding to the new printer name into the copied data. The data is then registered in the Windows registry.

By virtue of the foregoing arrangement, a new printer, having the identical configuration settings as those of an existing printer, can be created quickly and easily. Thus, this aspect of the invention often will permit creation of a new printer in less time and with less user intervention than conventional techniques. In addition, a new printer according to this aspect of the invention initially will have the same familiar configuration settings as an existing printer, rather than standard default configurations which are usually provided with conventional techniques. Accordingly, minor modifications can be made with only slight effort.

According to a further aspect, the invention is a printer driver for a Windows operating system which includes a number of user-selectable configuration settings and a user-selectable interface for instructing creation of a new printer. In response to actuation of the user-selectable interface, code within the printer driver creates the new printer and accesses an API of the Windows operating system so as to add an entry for the new printer to a printers branch of the registry in the Windows operating system. One feature of this aspect of the invention is that the new printer stores user-selected configuration settings together with a name of the new printer, and a value that points to a printer driver already installed in a drivers branch of the registry.

By virtue of the foregoing arrangement, a user can create a new printer merely by actuating the user interface provided by the printer driver. Moreover, the new printer stores user-selected configuration settings. Thus, in one embodiment described in detail below, a user simply selects desired configuration settings and then actuates a user interface to create a new printer having those configuration settings. Accordingly, new printers often can be created more quickly and easily than conventional techniques would permit. In addition, a new printer created according to the invention will store user-selected configuration settings, rather than just default configurations.

According to a still further aspect, the invention is a printer driver for a Windows operating system, which includes a user-selectable interface for instructing creation of a new printer and computer executable process steps stored on a computer readable medium for creating a new printer upon actuation of the user-selectable interface. These steps include steps to retrieve data for an existing printer, copy the data for the existing printer, so as to obtain copied data, obtain a name for the new printer, create a new printer object using the copied data, replace data corresponding to the name for the new printer into the new printer object, and update a printers branch of the registry in the Windows operating system to include an entry corresponding to the new printer object.

By virtue of the foregoing arrangement, a new printer having the same configurations as an existing printer can be created quickly and easily.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIGS. 3A to 3G illustrate various configurations of the Windows "Printers" folder for explaining the invention.

DETAILED DESCRIPTION OF THE PREFERRED EMBODIMENTS

Figure 1:
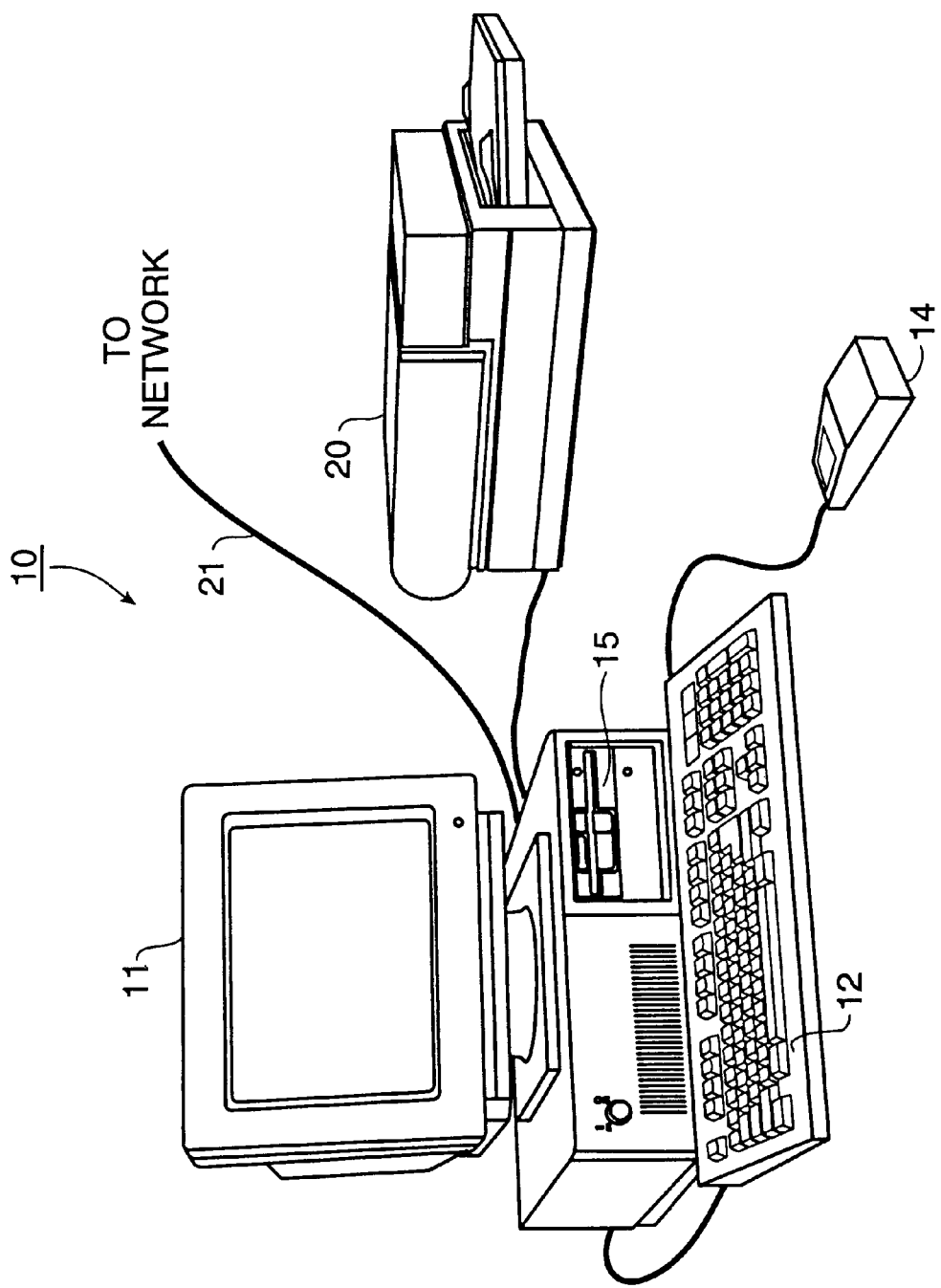
FIG. 1 is a view showing the outward appearance of a representative computer workstation embodying the invention.

FIG. 1 is a view showing the outward appearance of a representative computer workstation embodying the present invention. Shown in FIG. 1 is a workstation 10, such as an IBM PC or PC-compatible computer having a windowing environment, such as Microsoft Window™. Provided with workstation 10 is a display screen 11, such as a color monitor, a keyboard 12 for entering user commands, and a pointing device 14, such as a mouse, for pointing to and for manipulating objects displayed on screen 11.

Workstation 10 includes a mass storage device such as a computer disk 15 for storing data files and application program files. A printer 20 is provided for obtaining hardcopy output. In addition, workstation 10 can communicate with network printers and other peripherals, servers and workstations via network interface 21.

Figure 2:
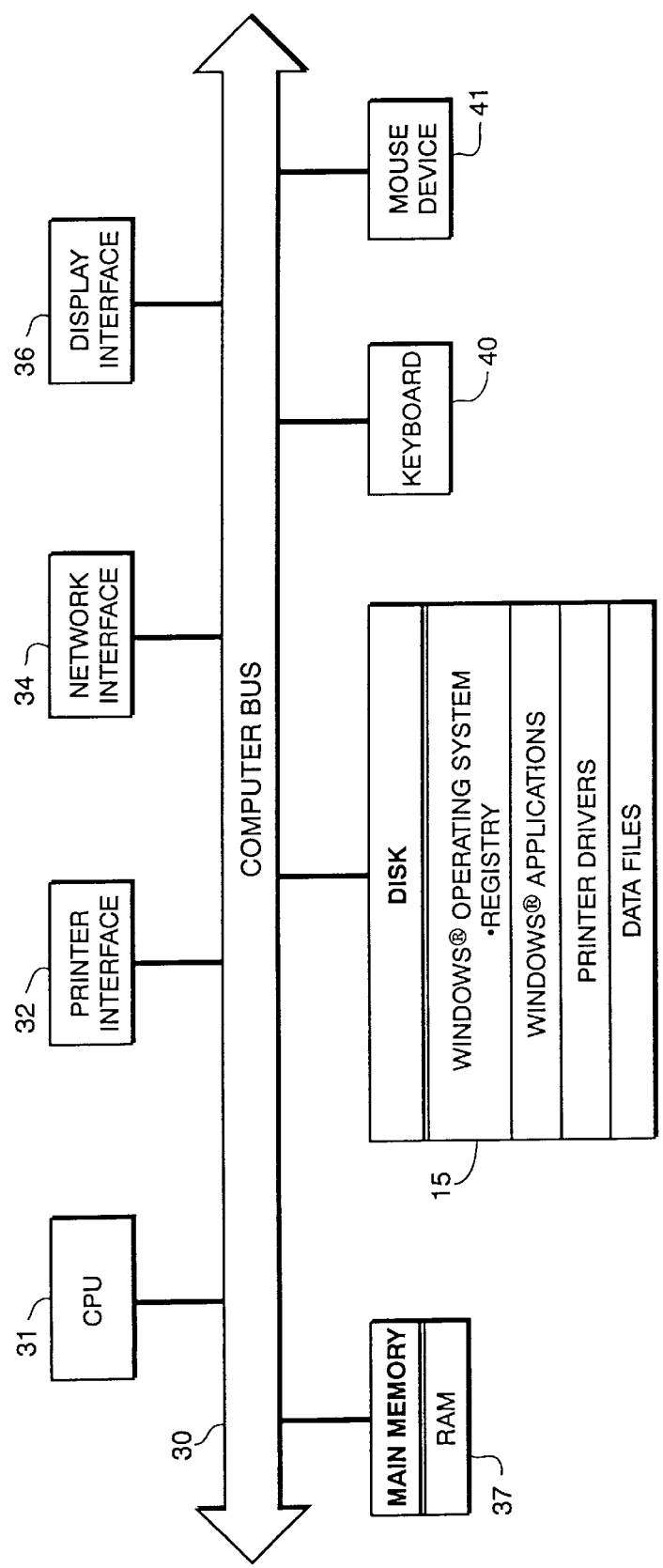
FIG. 2 is a detailed block diagram showing the internal construction of the workstation shown in FIG. 1.

FIG. 2 is a detailed block diagram showing the internal construction of workstation 10. As shown in FIG. 2, workstation 10 includes a central processing unit (CPU) 31 interfaced with a computer bus 30. Also interfaced with computer bus 30 is a printer interface 32, a network interface 34, a display interface 36, a keyboard interface 40, a mouse interface 41, a main memory 37, and a fixed disk 15. Disk 15 stores a Windows operating system, the Windows Registry, various Windows applications, printer drivers and data files. The main memory 37 interfaces with the computer bus 30 so as to provide random access memory storage for use by CPU 31 while executing stored process steps such as those of the stored application programs and printer drivers. More specifically, CPU 31 loads those process steps from disk 15 into the main memory 37 and executes those stored process steps out of main memory 37.

Figure 3A:
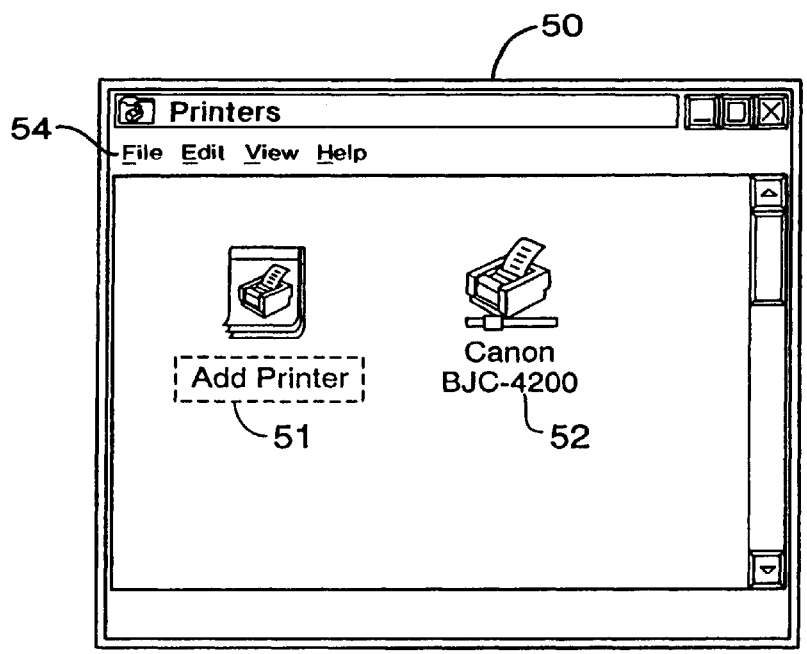

FIG. 3A is an illustration of a Printers folder in the Windows 95™ operating system. As shown in FIG. 3A, Printers folder 50 includes "Add Printer" icon 54 provided by Windows 95™. By double-clicking on Add Printers icon 54 and then providing information requested by a series of Windows-generated dialog boxes, a user can add new printers. Also included in Printers folder 50 is printer 52 which was added using the Windows Add Printer feature. By opening the property sheet for printer 52, the printer driver configuration settings for printer 52 can be changed.

Specifically, a printer property sheet is a graphical user interface created by the operating system, which includes property pages generated by the operating system and property pages generated and supplied by the printer driver. As described in more detail below, the property sheet permits a user to view and alter a printer's configuration settings.

The property sheet can be opened in a number of ways. For example, the property sheet for printer 52 can be opened by setting focus to the printer (i.e., single clicking on it), clicking on the "File" menu 54, and selecting "Properties". Alternatively, a user can right click on printer 52 to pull up its context menu, such as context menu 55 shown in FIG. 3B, and then select "Properties", such as item 59, from the context menu.

Figure 3B:
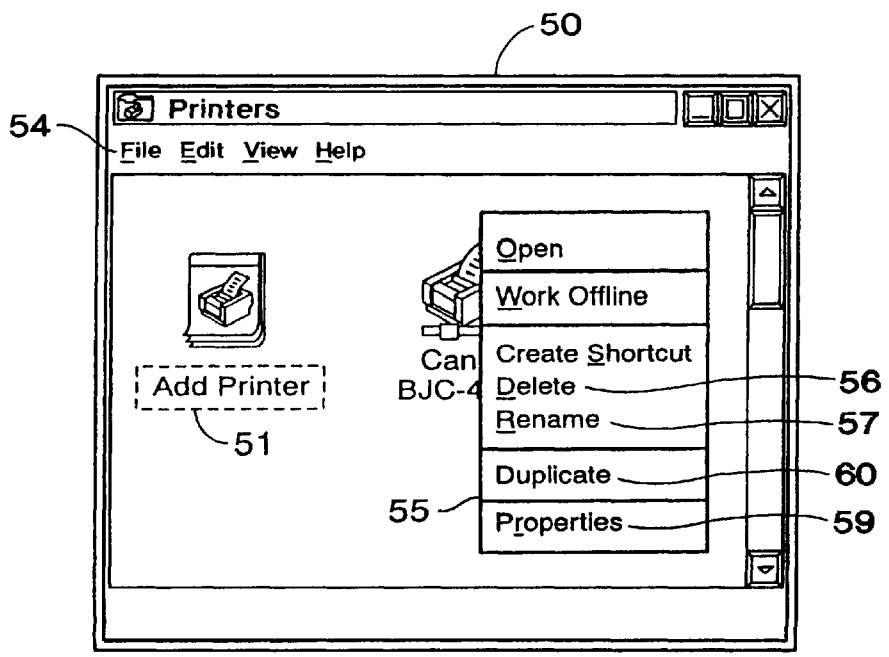
Figure 3C:
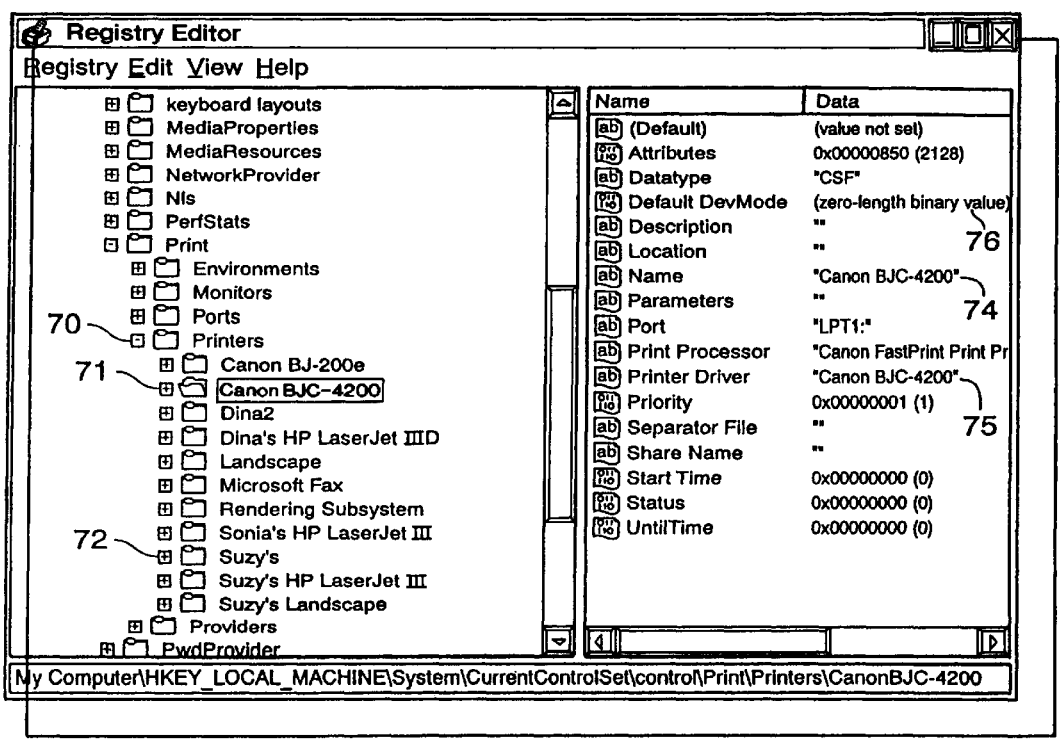

For each printer in the Printers folder, an entry exists in the Windows operating system registry. The registry is a hierarchically arranged database and includes various branches for storing references to many of the system's resources, including joystick configurations, keyboard layouts, fonts, printers and the like. A graphical depiction of a portion of a Windows registry, as displayed by the Windows registry editor, is shown in FIG. 3C. As seen in FIG. 3C, in the depicted registry there are eleven different printers under the printers branch. As noted above, each such printer also would be represented by an icon in the Windows Printers folder.

By designating one of the printers under the printers branch, information for that printer can be viewed on the right side of the split screen. The information displayed by the Windows registry editor is at least some of the same information displayed in the printer property sheet, but in a form somewhat closer to its raw data format. Thus, as shown in FIG. 3C information for the selected printer 71 is shown on the right side of the split screen. Using Windows terminology, each data item shown on the right side of the split screen is labelled a "value". The information includes general information such as name value 74 for the printer name and printer driver value 75. A textual printout of the information for selected printer 71 is shown in FIG. 3D.

As can be seen in FIGS. 3C and 3D, the printer driver for printer 71 does not use the Default DevMode value 76, which would otherwise hold information corresponding to current or default printer configuration settings. Rather, as described in more detail below, the printer driver for printer 71 uses separate files stored elsewhere on disk 15 for storing configuration information.

Other printer drivers, however, do use the Default DevMode value, as can be seen in the printout shown in FIG. 3E. Specifically, FIG. 3E shows information for printer 72. In FIG. 3E, the Default DevMode value 80 holds a block of data corresponding to current printer configuration settings. The bit data in this block provides information concerning such parameters as paper size and orientation, color resolution, and dither mode and collation flags. In addition, the first field of the Default DevMode value corresponds to the printer name. In FIG. 3E, portion 81 of the Default DevMode value contains ASCII codes for the printer name, "Suzy's".

Using the Windows registry editor, the printer information can be viewed and altered. Of course, the typical user generally finds it easier to view and alter such information using the printer's property sheet. This is particularly true with respect to the Default DevMode value information, which the Windows registry editor displays as a hexadecimal dump.

The first embodiment of the present invention will now be described. FIG. 3B illustrates the Printers folder after right clicking on printer 52 according to the first embodiment of the invention. As shown in FIG. 3B, right clicking on printer 52 brings up context menu 55. Context menu 55 includes Windows-provided context menu items 56 for deleting the printer, 57 for renaming the printer and 59 for opening the printer's property sheet, as described above.

In addition, in this embodiment of the invention an extra menu item 60 is provided. Context menu item 60 can be added to the context menu using a context menu extension handler, as is well-known in the art. Clicking on context menu item 60 will automatically result in the creation of a duplicate copy of printer 52, such as printer 54 shown in FIG. 3F. Although in this embodiment the duplicating function is initiated by selecting a context menu item, it should be understood that any number of other conventional user interfaces could be used either in addition to or instead of the context menu to initiate the duplicating feature of this embodiment.

Figure 4:
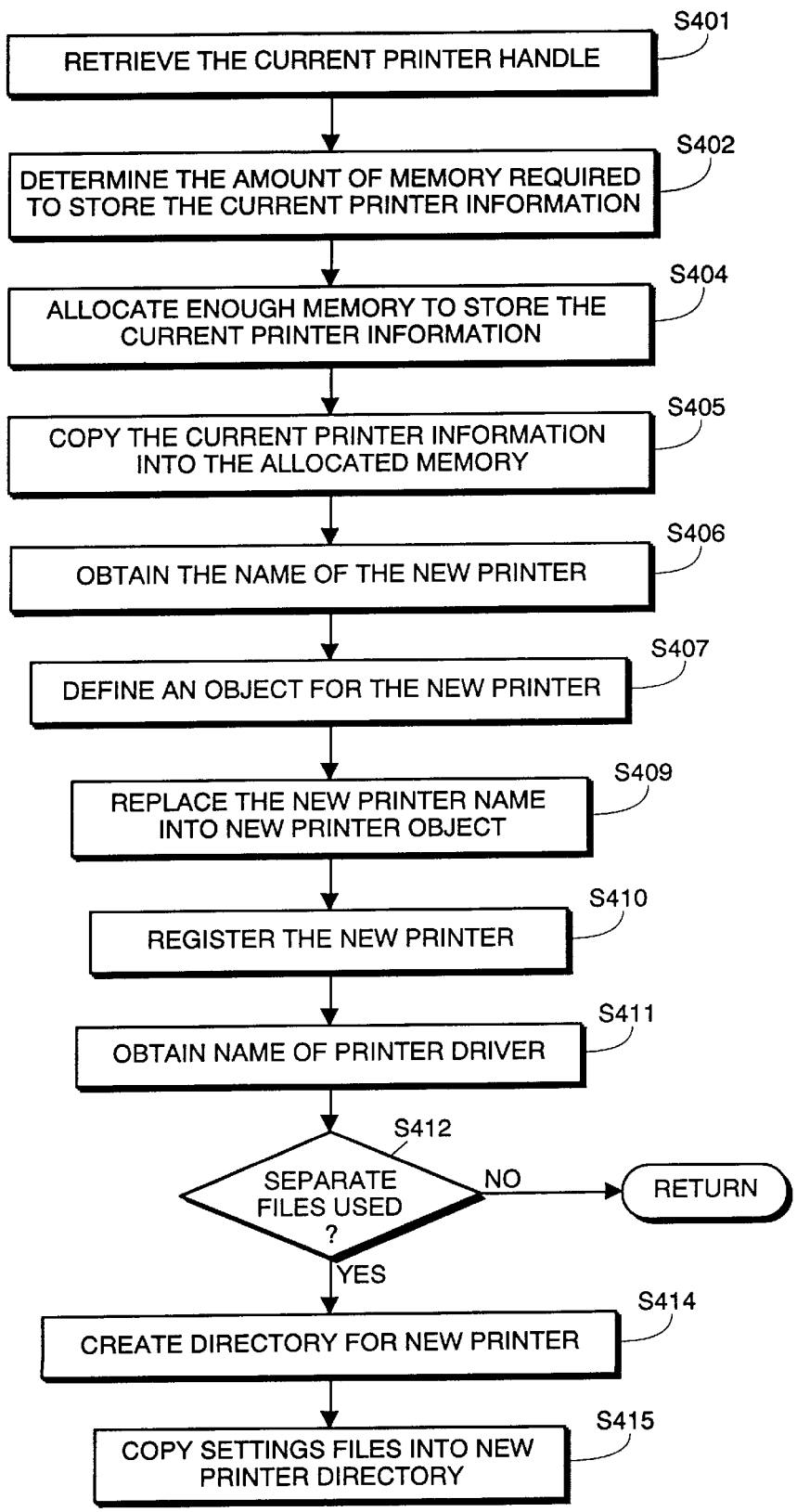
FIG. 4 is a flow diagram illustrating process steps for duplicating an existing printer and registering the new printer with the operating system, according to the first embodiment of the invention.

Duplicating a printer according to the first embodiment of the invention will now be described in detail with reference to FIG. 4. FIG. 4 is a flow diagram illustrating process steps performed when menu item 60 is selected from the context menu so as to duplicate a printer, according to the first embodiment of the invention. Preferably, the process steps shown in FIG. 4 are computer executable process steps which are initially stored on disk 15, and are downloaded into and then executed out of main memory 37.

Briefly, according to FIG. 4, the current printer handle is retrieved, the amount of memory required to store the current printer information is determined and that amount of memory is allocated, the current printer information is copied into the allocated memory, the name of the new printer is obtained, an object for the new printer is defined, the name of the new printer is replaced into the new printer object, the new printer is registered with the operating system, the printer driver name is retrieved, it is determined whether the printer driver uses separate files, a directory is created for the new printer, and the settings files in the directory for the current printer are copied into the new directory for the new printer.

More specifically, in step S401, the handle of the current printer is retrieved, the current printer in this embodiment being the printer for which the context menu has been opened. This step is preferably performed by using the Windows "OpenPrinter" API function.

In step S402, the amount of memory required to store the current printer information is determined. This step is preferably performed by using the Windows "GetPrinter" API function.

In step S404, memory is allocated to store the current printer information.

In step S405, information for the current printer is copied into the allocated memory. The copied information corresponds to the registry values for the printer discussed above, and includes the printer name, the printer driver name, and the physical printer port. As noted above, depending on the printer driver corresponding to the current printer, the copied information also may include default or current device mode information. This step is preferably performed by using the Windows "GetPrinter" API function.

Figure 3F:
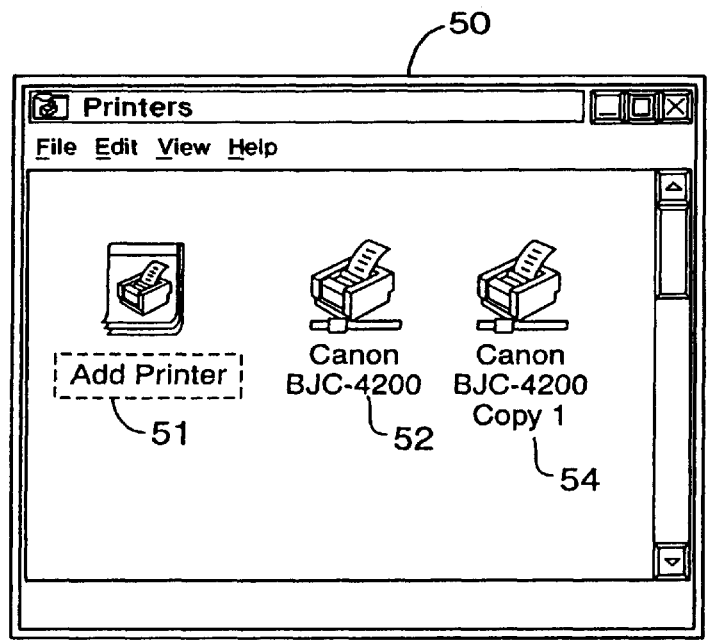

In step S406, the name of the new printer is obtained. In this embodiment, this step is preferably performed by generating a new printer name based on the current printer name. For example, as shown in FIG. 3F, the new printer name can be generated simply by appending "Copy n" to the end of the current printer name, where n is the smallest integer greater than zero for which the new printer name will not be duplicative of an existing printer name. However, the new printer name can also be obtained in other ways, such as deriving the new printer name from a selected settings name (as in the second embodiment discussed below) or by prompting the user to input the new printer name (as in the third embodiment).

In step S407, an object is defined for the data copied in step S405.

In step S409, the new printer name is stored into the new printer object, so as to replace the current printer name. More specifically, the new printer name is copied into a field in the new printer object corresponding to the value "Name" in the printers branch of the Windows registry. In addition, if the Default DevMode value is used by the printer driver, then the new printer name also is copied into a portion of the new printer object corresponding to the first field of the Default DevMode value.

In step S410, the new printer is registered with the operating system. In Windows 95™, this is preferably accomplished by using the Windows "AddPrinter" API function to add an entry corresponding to the new printer into the printers branch of the Windows registry.

The foregoing steps copy an existing printer so as to generate a new printer having the settings specified in the Default DevMode value of the existing printer. However, as indicated above, not all printer drivers utilize the Default DevMode value for storing default or current configuration settings. Rather, some printer drivers store and access setting information in separate files, such as setting up a separate directory for each printer. Moreover, printer drivers might use both the Default DevMode value and separate files to store settings information, such as by storing the printer driver's default settings in the Default DevMode value and by storing user selected settings information in separate files. Accordingly, after completing the foregoing process steps, the following process steps are preferably executed, so as to store setting information on disk 15 but not in the Windows registry.

More specifically, in step S411 the printer driver name is retrieved from the data copied in step S405.

In step S412, the printer driver name is looked up in a database to determine whether the printer uses separate files to store settings information, and if so, to obtain the path for locating those files and any naming convention information. For example, the printer driver might utilize a unique sub-directory for each printer, with each such sub-directory being located in the C:\Windows\System directory in the Windows 95™ operating system. The naming convention information is described in greater detail below. If the printer driver does not use separate files then processing is completed. Otherwise, processing proceeds to step S414.

In step S414, a directory is created for the new printer at the path location obtained in step S412. The directory is named according to the naming convention employed by the printer driver, as obtained in step S412. For example, one naming convention is to use the name of the printer as the name of the directory corresponding to the printer.

In step S415, all the settings files in the directory for the current printer are copied into the directory for the new printer.

Thus, the first embodiment of the invention permits easy creation of a new printer which has a different name but otherwise is identical to an existing printer. Once created according to this embodiment, the configuration settings of the new printer can be modified by pulling up its property sheet, as described above.

Figure 5:
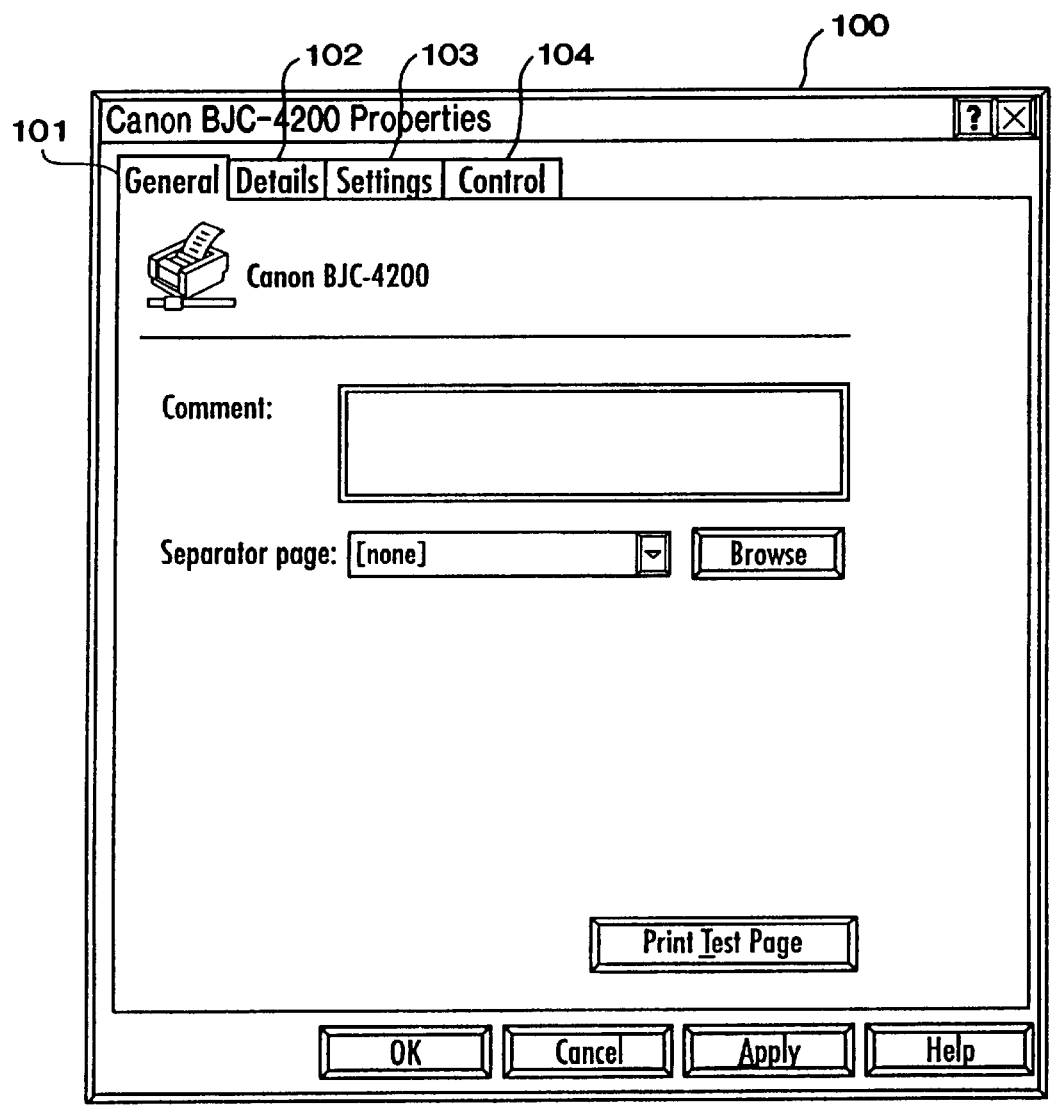
FIG. 5 illustrates the "General" page of a printer driver property sheet.

A second embodiment of the invention will now be described. In the second embodiment, a printer driver is provided which can create a new printer having a settings configuration selected from an existing printer. FIG. 5 illustrates a property sheet for a printer driver according to this embodiment of the invention. As shown in FIG. 5, property sheet 100 includes property pages 101 to 104, with the "General" property page 101 currently displayed. The "General" and "Details" property pages (101 and 102, respectively) are provided by the Windows 95™ operating system. The "Settings" and "Control" property pages (103 and 104, respectively) are provided by the printer driver. Initially, when a user selects Properties (such as from the context menu) the General page is displayed. However, a user can view other pages by clicking on the appropriate tab. For example, by clicking on the Settings tab 103 the property page shown in FIG. 6 is displayed.

Figure 6:
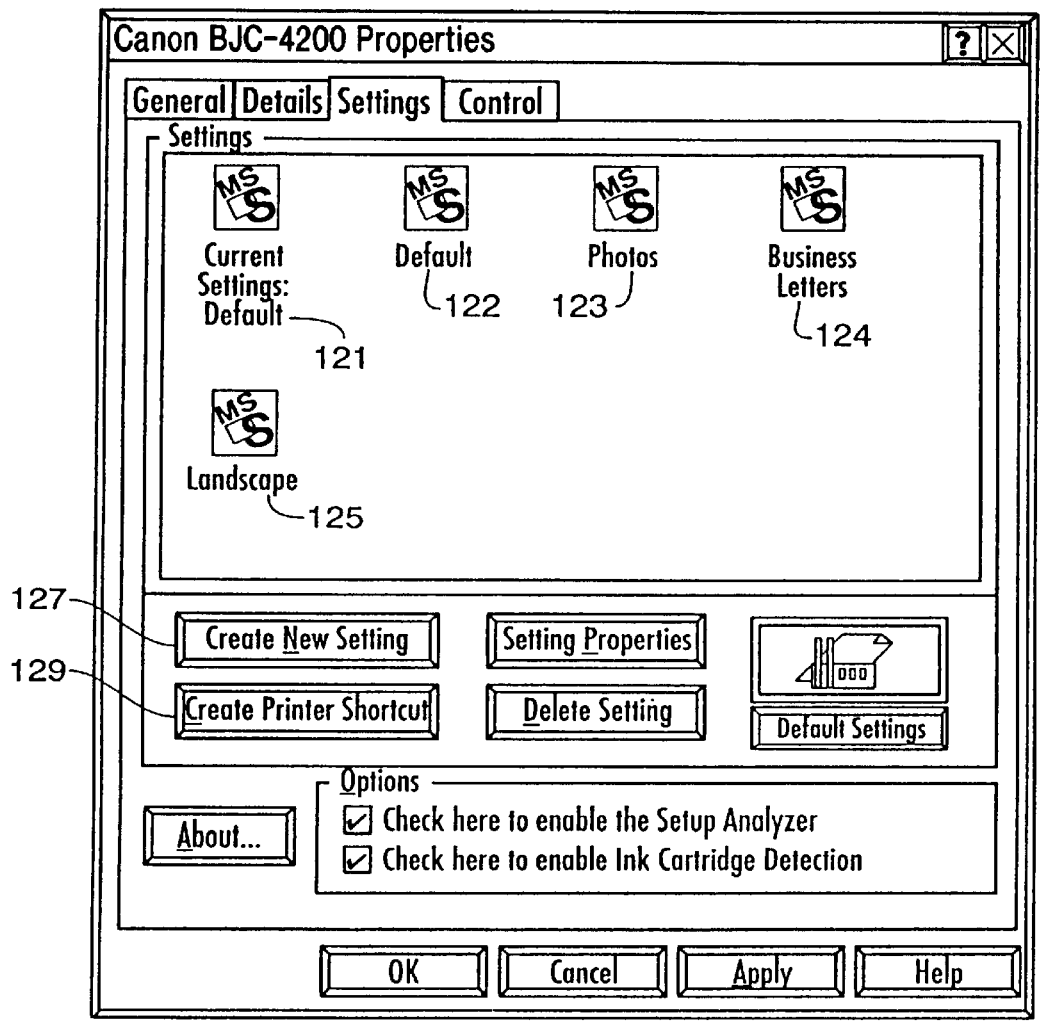
FIG. 6 illustrates the "Settings" page of a printer driver property sheet according to the invention.

As shown in FIG. 6, the printer driver according to the present invention stores a number of predefined settings 122 to 124, in addition to the current settings 121. For example, the printer driver provides a Default settings 122 and a Business Letters setting 124, which includes printer settings specifically tailored for printing business letters. Moreover, a user can create new settings by clicking on the Create New Setting button 127. The printer driver also can access a user-defined setting 130, which was created using the Create New Setting button 127. In the present embodiment, the setting information for each of settings 121 to 125 is stored in a separate file in the C:\Windows\System\BJC-4200 directory.

From the printer property sheet shown in FIG. 6, a user can change the current settings by double clicking on any one of the predefined settings or a user-defined setting. For example, double clicking on Business Letters icon 124 will change the current settings to the Business Letters settings.

The printer driver according to the present embodiment also provides a Create Printer Shortcut button 129. Designating a setting, such as settings 122 to 125, by single-clicking on the corresponding icon and then clicking on button 129 will automatically create and insert into the Printers folder a printer having the selected settings as its current settings.

Figure 7:
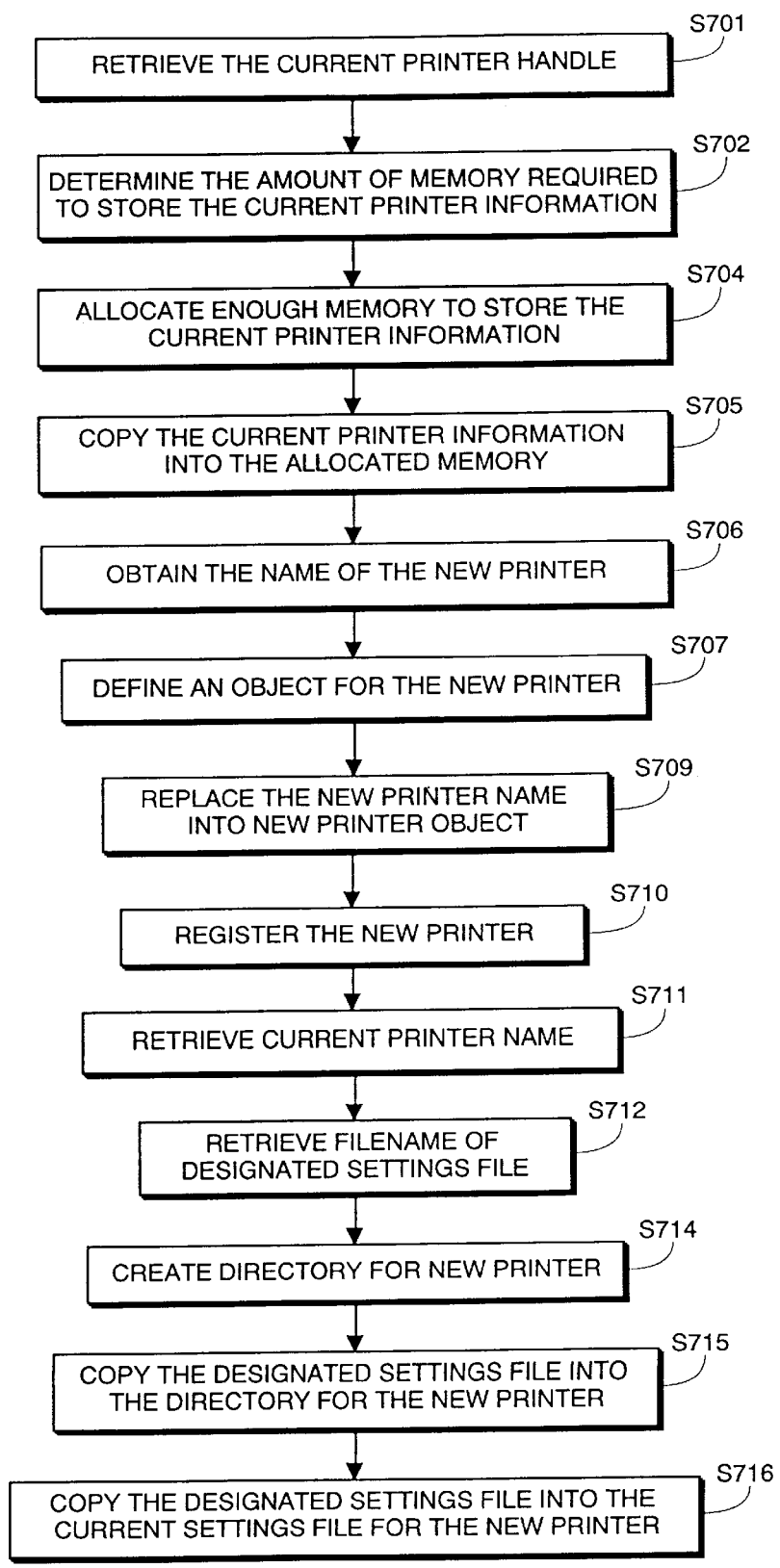
FIG. 7 is a flow diagram illustrating process steps for copying printer settings configuration files according to the second embodiment of the invention.

When the Create Printer Shortcut button 129 is designated, the computer executable process steps shown in FIG. 7 are executed, such as by downloading those steps from disk 15 into main memory 37 and then executing them out of main memory 37. FIG. 7 is a flow diagram illustrating process steps for copying settings information from a directory for an existing printer to a directory for a new printer when creating the new printer according to the second embodiment of the invention. Briefly, according to FIG. 7, the current printer handle is retrieved, the amount of memory required to store the current printer information is determined and that amount of memory is allocated, the current printer information is copied into the allocated memory, the name of the new printer is obtained, an object for the new printer is defined, the name of the new printer is replaced into the new printer object, the new printer is registered with the operating system, the current printer name is retrieved, the filename for a designated settings file is retrieved, a directory is created for the new printer, and the designated settings file is copied into a defined settings file and into a Current Settings file in the directory for the new printer. The following describes these steps in more detail.

In this embodiment, steps S701 to S705 are identical to steps S401 to S405, respectively, in the first embodiment. Accordingly, the descriptions of those steps are not repeated here.

In step S406, the name of the new printer is obtained. Preferably, in this embodiment the new name is generated based on the user-designated settings configuration. More preferably, the name of the new printer is identical to the designated settings configuration. However, it should be noted that the name of the new printer can also be obtained in other ways, such as generating the new name based on the existing printer name or requesting the user to provide the name.

Steps S707 to S710 are identical to steps S407 to S410, respectively, in the first embodiment. Accordingly, the descriptions of those steps are not repeated here.

In step S711, the name of the current printer is retrieved.

In step S712, the file name of the designated settings file is retrieved. As mentioned above, a user will have selected one of the defined settings configurations, such as 122 to 125, prior to designating Create Printer Shortcut 129. The name of the file storing the selected settings information is thus retrieved in this step.

In step S714, a new directory is created for the new printer. In the present embodiment, each printer in the Printers folder has its own sub-directory in the C:\Windows\System directory, with the sub-directory name being the same as the name of its corresponding printer. Accordingly, in this step a directory having the name of the new printer is created at that path.

In step S715, the designated settings file is copied into a newly created file in the directory for the new printer. Preferably, the name of the new file is the same as the name of the designated settings file.

In step S716, the designated settings file is copied into a newly created "Current Settings" file in the directory for the printer.

Preferably, the printer driver of the present embodiment includes a SaveSetting function for saving a settings file for the current printer. For ease of implementation, steps S715 and S716 preferably utilize this function. More specifically, to implement steps S715 and S716, the new printer is temporarily designated as the current printer, the SaveSetting function is twice executed to copy the two files, and then the original printer is once again designated as the current printer.

As a result of the foregoing processing a new printer is created having as its current settings a set of configuration settings selected from an existing printer. Thus, assume a user initially was editing the property sheet for printer 52 (FIG. 3A), as shown in FIG. 6. By designating setting 125 and then clicking on Create Printer Shortcut button 129, a new printer 55 named "Landscape" automatically would be added to the Printers folder, as shown in FIG. 3G, and the user would automatically return to editing the property sheet shown in FIG. 6.

Figure 3G:
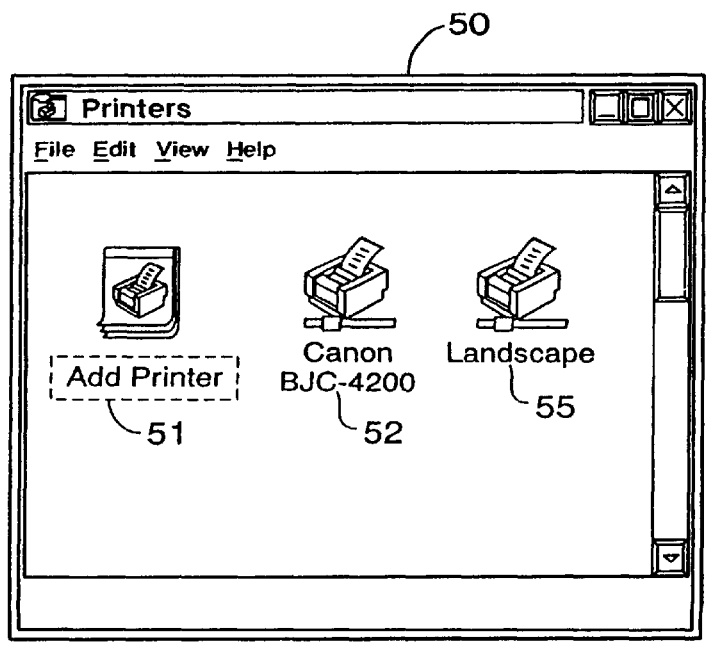

Moreover, new printer 54 shown in FIG. 3G would include the Landscape setting 125 shown in FIG. 6 and would have the Landscape settings as its Current Settings. Since each existing printer permits creation of new user defined settings configurations, as well as editing of existing user-defined and pre-defined settings configurations, this embodiment permits creation of a new printer that stores user-selected configuration settings.

A third embodiment of the invention will now be discussed. In the third embodiment, a printer driver is provided which has a property sheet similar to that shown in FIGS. 5 and 6. In particular, the Settings page of the property sheet according to this embodiment also includes Current Settings, pre-defined settings and user-defined settings, similar to that shown in FIG. 6. The properties of each of those settings files can be altered by right clicking on the icon corresponding to the setting file and selecting Properties from the context menu displayed. Upon doing so, a property sheet for the selected setting will be displayed, such as settings property sheet 300 shown in FIG. 8.

Figure 8:
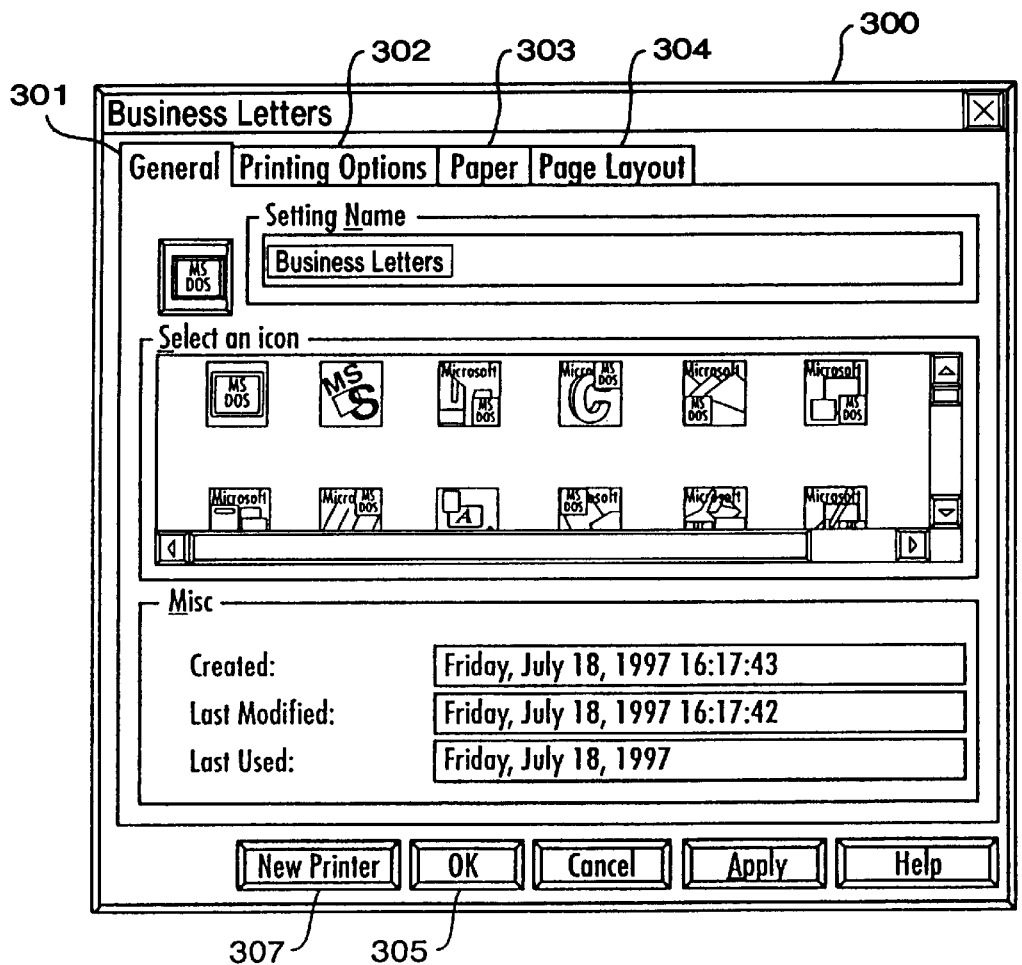
FIG. 8 illustrates the "General" page of a printer's settings property sheet according to the invention.
Figure 9:
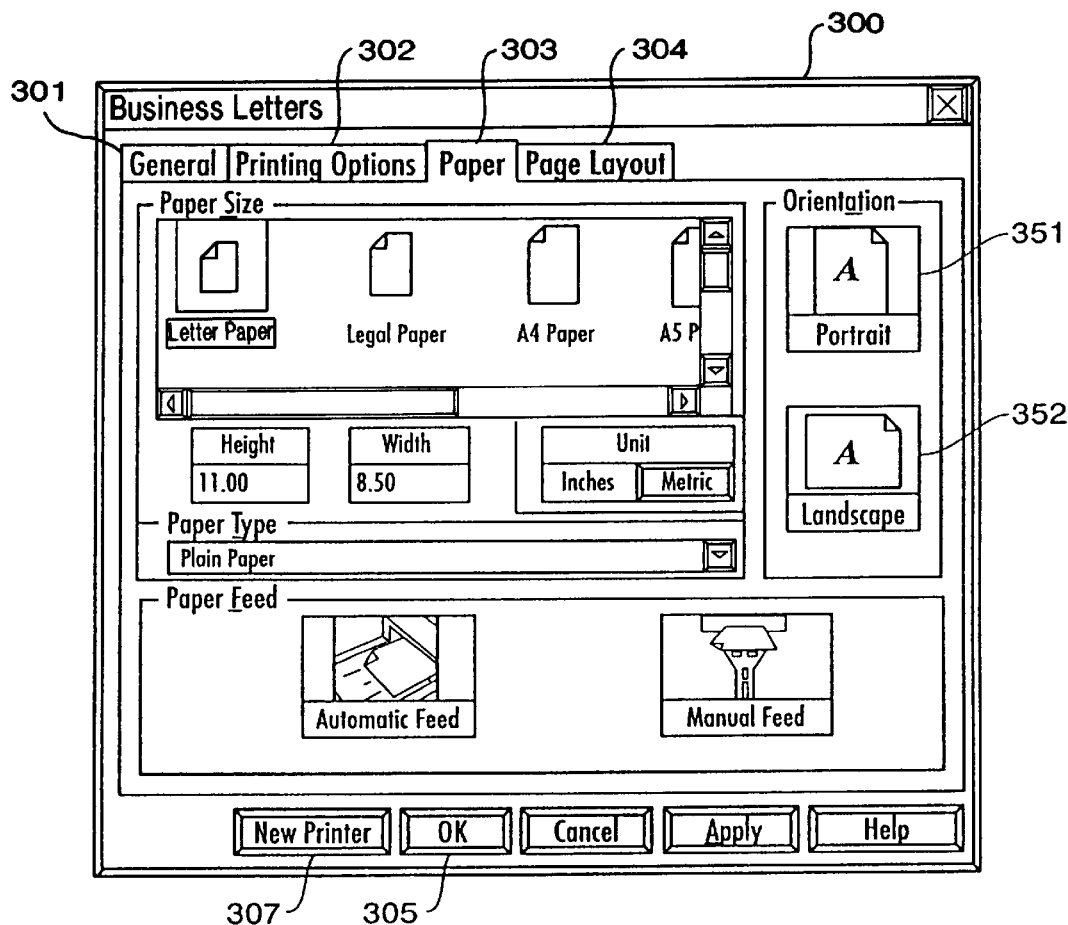
FIG. 9 illustrates the "Paper" page of a printer's settings property sheet according to the invention.

FIG. 8 illustrates property sheet 300 for the Business Letters settings configuration. Property sheet 300 includes property pages 301 to 304, with the General property page 301 currently being displayed. Using property sheet 300, the Business Letters configuration settings for the current printer can be modified. For example, a user can change paper size and orientation, or select from among different modes for printing graphics. When a user has modified these settings to his satisfaction, he can click on OK button 305 to save those settings to the Business Letters settings configuration and return to the Settings page of the printer property sheet, as shown in FIG. 6.

A user also can create a new setting by clicking on button 127 shown in FIG. 6. Doing so will bring up the General page of the property sheet for the new setting. Initially, the new setting will be configured with default settings, but this configuration can be changed using the new setting property sheet. Upon completion, clicking on "OK" button 205 will save the new settings configuration under the name specified by the user and will return the user to the printer property page shown in FIG. 6.

According to this embodiment of the invention, the settings property sheet provided by the printer driver, such as property sheet 300 shown in FIG. 8, includes "New Printer" button 307. Button 307 can be designated by a user either when editing an existing settings configuration or when creating a new settings configuration. Specifically, when a user has finished adjusting the settings to his satisfaction, either "OK" button 305 or "New Printer" button 307 can be designated. If OK button 305 is selected, then the existing settings configuration is modified (if an existing settings configuration is being edited) or a new settings configuration is added (if the property sheet was pulled up in response to a designation of "Create New Setting") in the existing printer. Upon clicking on button 307, on the other hand, the existing printer is left unchanged, and a new printer is created having as its current settings the settings selected by the user. Until either "OK" button 305 or "New Printer" button 307 is selected, the changed settings are stored in a temporary object. In this embodiment, the temporary object is stored in a separate file.

For example, assume that a user has pulled up the property sheet for the Business Letters settings, as shown in FIG. 8. Next, the user clicks on the Paper tab 303 to pull up the Paper page 303 of property sheet 300. The paper page 303 is shown in FIG. 11. As shown in FIG. 11, the Business Letters settings has the paper orientation selected as portrait. That is, button 351 has been selected. A user might click on button 352, thereby changing the selected orientation from portrait to landscape. The change, however, is not made to the Business Letters settings until OK button 305 is clicked. If, rather than clicking OK button 305, a user clicks on New Printer button 307, then a new printer will be created with its current settings configured identically to the Business Letters settings of the existing printer except that the current settings of the new printer will have landscape orientation rather than portrait. In addition, the current printer, that is, the printer whose settings are controlled by the opened property sheet, will now be the new printer.

Figure 10:
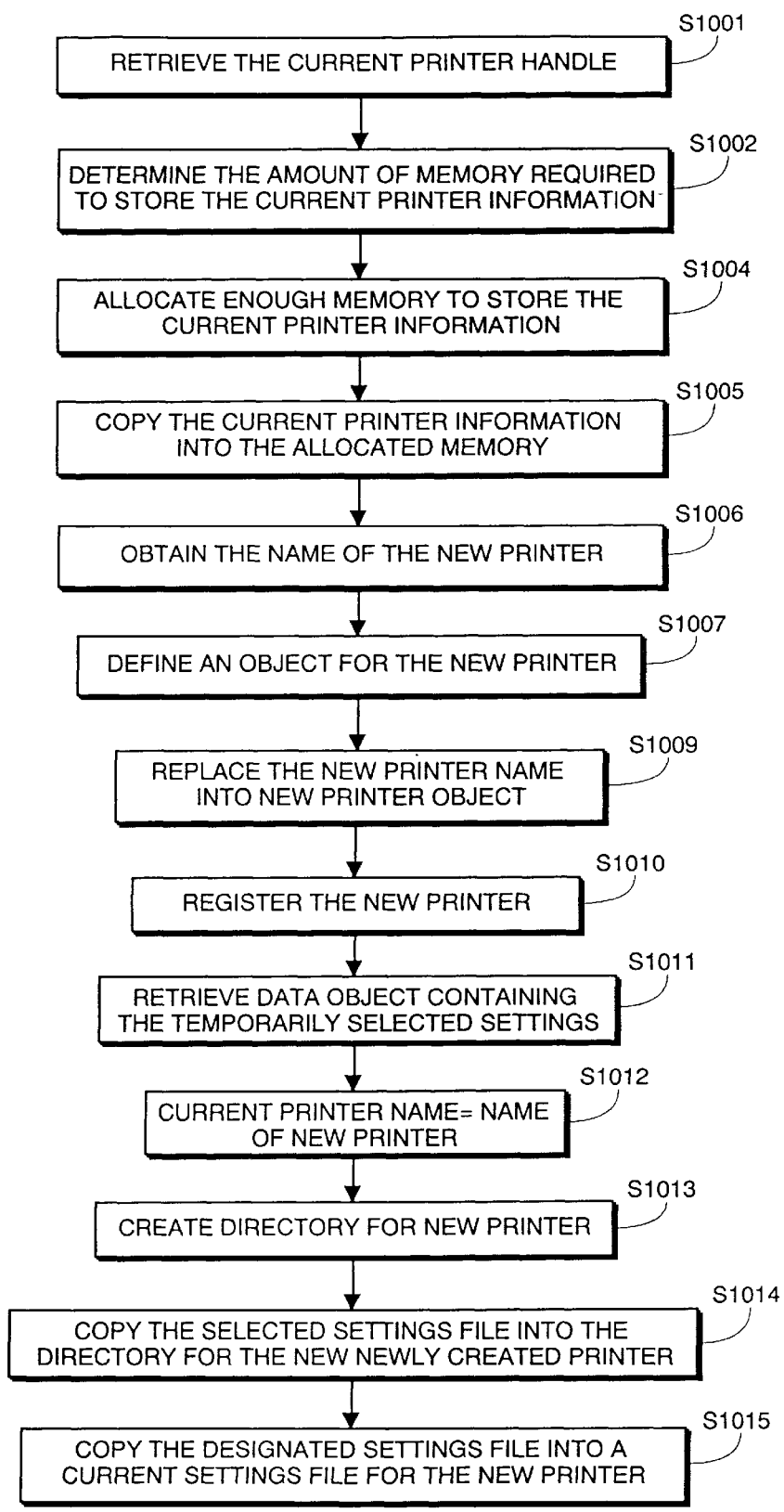
FIG. 10 is a flow diagram illustrating process steps for copying printer settings configuration files according to the third embodiment of the invention.

When button 307 is selected, the process steps shown in FIG. 10 are executed. Those process steps can be performed by downloading them from disk 10 into main memory 37, and executing them from main memory 37 using CPU 31. Briefly, according to FIG. 10, the current printer handle is retrieved, the amount of memory required to store the current printer information is determined and that amount of memory is allocated, the current printer information is copied into the allocated memory, the name of the new printer is obtained, an object for the new printer is defined, the name of the new printer is replaced into the new printer object, the new printer is registered with the operating system, the name of the file that stores the temporarily selected settings is obtained, the new printer is designated to be the current printer, a directory is created for the new printer, and the temporarily selected settings file is copied into a defined settings file and also copied into a Current Settings file in the directory for the new printer. These steps are described in more detail below.

In this embodiment, steps S1001 to S1005 are identical to steps S401 to S405, respectively, in the first embodiment. Accordingly, the descriptions of those steps are not repeated here.

In step S1006, the name of the new printer is obtained. Preferably, in this embodiment the new name is obtained by displaying a dialog box and prompting the user to input a name for the new printer. However, the name of the new printer can also be generated internally, such as described for the first and second embodiments.

Steps S1007 to S1010 are identical to steps S407 to S410, respectively, in the first embodiment. Accordingly, the descriptions of those steps are not repeated here.

In step S1011, the file storing the temporarily selected settings is retrieved. In this regard, as noted above the settings changes selected by a user are stored in a temporary file until the user instructs saving those changes to a settings file (e.g., clicking on "OK") or saving the changes to a new printer (e.g., clicking on the "New Printer" button). Thus, the name of this temporary file is retrieved in this step.

In step S1012, the new printer is designated as the current printer.

In step S1013, a new directory is created for the new printer. Similar to the second embodiment, in the present embodiment, each printer in the Printers folder has its own sub-directory in the C:\Windows\System directory, with the subdirectory name being the same as the name of its corresponding printer. Accordingly, in this step a directory having the name of the new printer is created at that path.

In step S1014, the temporary settings file retrieved in step S1011 is copied into a file in the directory for the new printer. Preferably, the name for the new file is identical to the name obtained for the new printer.

In step S1015, the temporary settings file identified in step s1011 is copied into the directory for the new printer, the name of the new file being "Current Settings".

Accordingly, upon completion of the foregoing processing, a new printer is created having user-selected settings as its current settings, without the need to have an existing settings configuration file or to create a new settings configuration file as in the second embodiment.

The invention has been described above with respect to particular illustrative embodiments. However, it is to be understood that the invention is not limited to the above-described embodiments. Various other changes and modifications may be made by those of ordinary skill in the art without departing from the spirit and scope of the invention.

What is claimed is:

1. Computer executable process steps stored on a computer readable medium for creating a new printer object, comprising:
   a copying step to copy data contained in a registry corresponding to an existing printer object;
   a creating step to create the new printer object using the copied data;
   a substituting step to substitute an obtained new printer object name into the new printer object; and
   an adding step to add the new printer object in the registry, the registry thereby containing data corresponding to the existing printer object and the new printer object.

2. Computer executable process steps according to claim 1, wherein the new printer object name is obtained from a user via a user interface.

3. Computer executable process steps according to claim 2, wherein the user interface comprises a dialog box.

4. Computer executable process steps according to claim 1, wherein the new printer object name is generated based on an existing printer object name.

5. Computer executable process steps according to claim 1, wherein the new printer object name is generated based on a name corresponding to a selected setting for the existing printer object.

6. Computer executable process steps according to claim 1, further comprising a defining step to define the new printer object.

7. Computer executable process steps according to claim 1, wherein the adding step further comprising a registering step to register the new printer object with an operating system.

8. Computer executable process steps according to claim 7, wherein the registering step updates a printers branch of the registry in the operating system.

9. Computer executable process steps according to claim 8, wherein the new printer object name is substituted into a portion of the copied data corresponding to a device mode key and into a portion of the copied data corresponding to a printer name key, both the device mode key and the printer name key residing in the printers branch of the registry.

10. Computer executable process steps according to claim 1, wherein the copying step copies a configuration settings file from a directory for the existing printer object to a directory for the new printer object.

11. Computer executable process steps according to claim 1, wherein data corresponding to user specified configuration settings is substituted into a portion of the copied data corresponding to a device mode key in a printers branch of the registry in an operating system.

12. Computer executable process steps according to claim 1, wherein the new printer object is represented by an icon.

13. A printer driver comprising:
   a plurality of user-selectable configurations associated with an existing printer, each of the configurations comprising configuration settings;
   code to receive an instruction to create a new printer object; and
   code to create the new printer object and to request an operating system to add an entry for the new printer object to a registry in the operating system when the instruction is received;
   wherein the new printer object contains the configuration settings of a selected one of the user-selectable configurations and information that points to the printer driver.

14. A printer driver according to claim 13, wherein the code to create the new printer object includes code to copy data corresponding to an existing printer object.

15. A printer driver according to claim 13, further comprising code to substitute a new printer object name into the new printer object.

16. A printer driver according to claim 13, wherein the code to create the new printer object includes code to copy a configuration settings file from a directory for an existing printer object to a directory for the new printer object.

17. A printer driver according to claim 15, further comprising code to obtain the new printer object name.

18. A printer driver according to claim 17, wherein the code to obtain the new printer object name includes code to display a dialog box.

19. A printer driver according to claim 13, further comprising code to generate a new printer object name based on an existing printer object name.

20. A printer driver according to claim 13, further comprising code to generate a new printer object name based on a name corresponding to a selected settings file for an existing printer object.

21. A printer driver according to claim 13, wherein settings in the selected one of the user-selectable configurations have been set by changing the configuration settings for an existing printer object.

22. A printer driver according to claim 13, wherein settings in the selected one of the user-selectable configurations have been set by designating a configuration settings file corresponding to an existing printer object.

23. A printer driver according to claim 13, wherein the new printer object is represented by an icon.

24. A machine-readable memory medium for storing computer-executable process steps to create a new printer object, said computer-executable process steps comprising:
   a copying step to copy data contained in a registry corresponding to an existing printer object;

a creating step to create the new printer object using the copied data;

a substituting step to substitute an obtained new printer object name into the new printer object; and an adding step to add the new printer object, in the registry, the registry thereby containing data corresponding to the existing printer object and the new printer object.

25. A machine-readable memory medium according to claim 24, wherein the new printer object name is obtained from a user via a user interface.

26. A machine-readable memory medium according to claim 25, wherein the user interface comprises a dialog box.

27. A machine-readable memory medium according to claim 24, wherein the new printer object name is generated based on an existing printer object name.

28. A machine-readable memory medium according to claim 24, wherein the new printer object name is generated based on a name corresponding to a selected setting for the existing printer object.

29. A machine-readable memory medium according to claim 24, wherein said computer-executable process steps further comprise a defining step to define the new printer object.

30. A machine-readable memory medium according to claim 24, wherein the adding step further comprise a registering step to register the new printer object with an operating system.

31. A machine-readable memory medium according to claim 30, wherein the registering step updates a printers branch of the registry in the operating system.

32. A machine-readable memory medium according to claim 31, wherein the new printer object name is substituted into a portion of the copied data corresponding to a device mode key and into a portion of the copied data corresponding to a printer name key, both the device mode key and the printer name key residing in the printers branch of the registry.

33. A machine-readable memory medium according to claim 24, wherein the copying step copies a configuration settings file from a directory for the existing printer object to a directory for the new printer object.

34. A machine-readable memory medium according to claim 24, wherein data corresponding to user specified configuration settings is substituted into a portion of the copied data corresponding to a device mode key in a printers branch of the registry.

35. A machine-readable memory medium according to claim 24, wherein the new printer object is represented by an icon.

36. A computer for creating a new printer object, comprising:

copying means for copying data contained in a registry corresponding to an existing printer object;

creating means for creating the new printer object using the copied data;

substituting means for substituting an obtained new printer object name into the new printer object; and adding means for adding to the new printer object, in the registry, the registry thereby containing data corresponding to the existing printer object and the new printer object.

37. A computer according to claim 36, wherein the new printer object name is obtained from a user via a user interface.

38. A computer according to claim 37, wherein the user interface comprises a dialog box.

39. A computer according to claim 36, wherein the new printer object name is generated based on an existing printer object name.

40. A computer according to claim 36, wherein the new printer object name is generated based on a name corresponding to a selected setting for the existing printer object.

41. A computer according to claim 36, further comprising defining means for defining the new printer object.

42. A computer according to claim 36, wherein said adding means further comprising a registering means for registering the new printer object with an operating system.

43. A computer according to claim 42, wherein the registering means updates a printers branch of the registry in the operating system.

44. A computer according to claim 43, wherein the new printer object name is substituted into a portion of the copied data corresponding to a device mode key and into a portion of the copied data corresponding to a printer name key, both the device mode key and the printer name key residing in the printers branch of the registry.

45. A computer according to claim 36, wherein the copying means copies a configuration settings file from a directory for the existing printer object to a directory for the new printer object.

46. A computer according to claim 36, wherein data corresponding to user specified configuration settings is substituted into a portion of the copied data corresponding to a device mode key in a printers branch of the registry.

47. A computer according to claim 36, wherein the new printer object is represented by an icon.

48. Computer-executable process steps stored on a computer-readable medium, the computer-executable process steps for creating a new printer object, said computer-executable process steps comprising:

copying code to copy data contained in a registry corresponding to an existing printer object;

creating code to create the new printer object using the copied data;

substituting code to substitute an obtained new printer object name into the new printer object; and adding code to add the new printer object in the registry, the registry thereby containing data corresponding to the existing printer object and the new printer object.

49. Computer-executable process steps according to claim 48, wherein the new printer object name is obtained from a user via a user interface.

50. Computer-executable process steps according to claim 49, wherein the user interface comprises a dialog box.

51. Computer-executable process steps according to claim 48, wherein the new printer object name is generated based on an existing printer object name.

52. Computer-executable process steps according to claim 48, wherein the new printer object name is generated based on a name corresponding to a selected setting for the existing printer object.

53. Computer-executable process steps according to claim 48, further comprising defining code to define the new printer object.

54. Computer-executable process steps according to claim 48, wherein the adding code further comprising registering code to register the new printer object with an operating system.

55. Computer-executable process steps according to claim 54, wherein the registering code includes code to update a printers branch of the registry in the operating system.

56. Computer-executable process steps according to claim 55, wherein the substituting code includes code to substitute the new printer object name into a portion of the copied data corresponding to a device mode key and into a portion of the copied data corresponding to a printer name key, both the device mode key and the printer name key residing in the printers branch of the registry.

57. Computer-executable process steps according to claim 48, wherein the copying code includes code to copy a configuration settings file from a directory for the existing printer object to a directory for the new printer object.

58. Computer-executable process steps according to claim 48, further comprising code to substitute data corresponding to user specified configuration settings into a portion of the copied data corresponding to a device mode key in a printers branch of the registry.

59. Computer-executable process steps according to claim 48, wherein the new printer object is represented by an icon.

60. A computer that stores a printer driver which includes a plurality of user-selectable configurations associated with an existing printer, each of the configurations comprising configuration settings, said computer comprising:

receiving means for receiving an instruction to create a new printer object; and creating means for creating the new printer object and requesting an operating system to add an entry for the new printer object to a registry in the operating system when the instruction is received;

wherein the new printer object contains the configuration settings of a selected one of the user-selectable configurations and information that points to the printer driver.

61. A computer according to claim 60, wherein said creating means copies data corresponding to an existing printer object.

62. A computer according to claim 60, further comprising substituting means for substituting a new printer object name into the new printer object.

63. A computer according to claim 60, wherein said creating means copies a configuration settings file from a directory for an existing printer object to a directory for the new printer object.

64. A computer according to claim 62, further comprising obtaining means for obtaining the new printer object name.

65. A computer according to claim 64, wherein said obtaining means displays a dialog box.

66. A computer according to claim 60, further comprising generating means for generating a new printer object name based on an existing printer object name.

67. A computer according to claim 60, further comprising generating means which generates a new printer object name based on a name corresponding to a selected settings file for an existing printer object.

68. A computer according to claim 60, wherein the user-selectable configurations have been set by changing the configuration settings for an existing printer object.

69. A computer according to claim 60, wherein the user-selectable configurations have been set by designating a configuration settings file corresponding to an existing printer object.

70. A computer according to claim 60, wherein the new printer object is represented by an icon.

71. A machine-readable memory medium for storing computer-executable process steps to constitute a printer driver, the printer driver comprising:

a plurality of user-selectable configurations associated with an existing printer, each of the configurations comprising configuration settings;

code to receive an instruction to create a new printer object; and code to create the new printer object and to request an operating system to add an entry for the new printer object to a registry in the operating system when the instruction is received;

wherein the new printer object contains the configuration settings of a selected one of the user-selectable configurations and information that points to the printer driver.

72. A machine-readable memory medium according to claim 71, wherein the code to create the new printer object includes code to copy data corresponding to an existing printer object.

73. A machine-readable memory medium according to claim 71, the printer driver further comprising code to substitute a new printer object name into the new printer object.

74. A machine-readable memory medium according to claim 71, wherein the code to create the new printer object includes code to copy a configuration settings file from a directory for an existing printer object to a directory for the new printer object.

75. A machine-readable memory medium according to claim 73, the printer driver further comprising code to obtain the new printer object name.

76. A machine-readable memory medium according to claim 75, wherein the code to obtain the new printer object name includes code to display a dialog box.

77. A machine-readable memory medium according to claim 71, the printer driver further comprising code to generate a new printer object name based on an existing printer object name.

78. A machine-readable memory medium according to claim 71, the printer driver further comprising code to generate a new printer object name based on a name corresponding to a selected settings file for an existing printer object.

79. A machine-readable memory medium according to claim 71, wherein the user-selectable configurations have been set by changing the configuration settings for an existing printer object.

80. A machine-readable memory medium according to claim 71, wherein the user-selectable configurations have been set by designating a configuration settings file corresponding to an existing printer object.

81. A machine-readable memory medium according to claim 71, wherein the new printer object is represented by an icon.

* * * * *

UNITED STATES PATENT AND TRADEMARK OFFICE
CERTIFICATE OF CORRECTION

PATENT NO. : 6,184,998 B1
DATED : February 6, 2001
INVENTOR(S) : Haim M. Tebeka

It is certified that error appears in the above-identified patent and that said Letters Patent is hereby corrected as shown below:

Title page,
Item [54], "PRINTING" should read -- PRINTERS --.

ABSTRACT
Item [57], line 3, "obtained" should read -- obtain --.

Column 1,
Item [54], "PRINTING" should read -- PRINTERS --.

Column 3,
Line 60, "Window ™." should read -- Windows ™. --.

Column 5,
Line 56, "computer executable" should read -- computer-executable --.

Column 9,
Line 23, "user" should read -- user- --.

Column 11,
Line 62, "comprising" should read -- comprises --.

Column 13,
Line 25, "comprise" should read -- comprises --.
Line 44, "user specified" should read -- user-specified --.

Column 14,
Line 9, "comprising" should read -- comprises --.
Line 26, "user specified" should read -- user-specified --.
Line 60, "comprising" should read -- comprises --.

UNITED STATES PATENT AND TRADEMARK OFFICE
CERTIFICATE OF CORRECTION

PATENT NO. : 6,184,998 B1
DATED : February 6, 2001
INVENTOR(S) : Haim M. Tebeka

It is certified that error appears in the above-identified patent and that said Letters Patent is hereby corrected as shown below:

<u>Column 15,</u>
Line 12, "user specified" should read -- user-specified --.

Signed and Sealed this

Twenty-sixth Day of February, 2002

Attest:

JAMES E. ROGAN
*Attesting Officer*    *Director of the United States Patent and Trademark Office*